United States Patent [19]

Person

[11] 4,232,183
[45] Nov. 4, 1980

[54] ELECTRICAL CONNECTION SYSTEM FOR PANEL STRUCTURES

[76] Inventor: Nelson H. Person, 1465 W. Catalpa St., Chicago, Ill. 60640

[21] Appl. No.: 828,918

[22] Filed: Aug. 29, 1977

[51] Int. Cl.$^3$ ............................................. H02G 3/00
[52] U.S. Cl. ....................................... 174/48; 52/221; 160/127; 160/135
[58] Field of Search ...................... 174/48, 49; 52/220, 52/221; 160/135, 351, 127; 362/431, 218.4

[56] References Cited

U.S. PATENT DOCUMENTS

| | | | |
|---|---|---|---|
| 3,194,361 | 7/1965 | Thurman | 174/48 X |
| 3,195,698 | 7/1965 | Codrea | 52/221 X |
| 3,377,756 | 4/1968 | Polhamus | 174/48 X |
| 3,683,100 | 8/1972 | Deal et al. | 174/48 |
| 3,707,165 | 12/1972 | Stahl | 174/48 X |
| 3,759,297 | 9/1973 | Anderson et al. | 174/48 X |
| 3,856,981 | 12/1974 | Boundy | 174/48 |
| 3,889,044 | 6/1975 | Flachbarth et al. | 174/48 |
| 3,909,502 | 9/1975 | Lacan | 174/48 |
| 3,985,924 | 10/1976 | Pritza | 362/431 X |
| 4,020,604 | 5/1977 | Legler et al. | 52/221 X |
| 4,060,294 | 11/1977 | Haworth et al. | 52/221 X |

FOREIGN PATENT DOCUMENTS

659030  7/1965  Belgium ..................... 174/49

*Primary Examiner*—B. A. Reynolds
*Assistant Examiner*—D. A. Tone
*Attorney, Agent, or Firm*—Hill, Van Santen, Steadman, Chiara & Simpson

[57] ABSTRACT

An arrangement for facilitating wiring of partition structures for the supply of electrical power thereto, particularly partition structures employing a plurality of wall panels and cooperable elongated supporting columns therefor in which the vertical end edges of at least a pair of adjacent panels are supported by cooperable connecting means from a common hollow column, with the column forming a connecting conduit for electrical conductors associated with the respective wall panels, whereby the connecting wiring between wall panels is disposed within the column. The invention includes novel arrangements for effecting electrical connections between panels and power supply lines, between panels and between lamp fixtures supported by the panels, as well as novel connecting structures between panels and supporting columns. The invention also includes novel supporting means for connecting wall panels with such a column.

43 Claims, 21 Drawing Figures

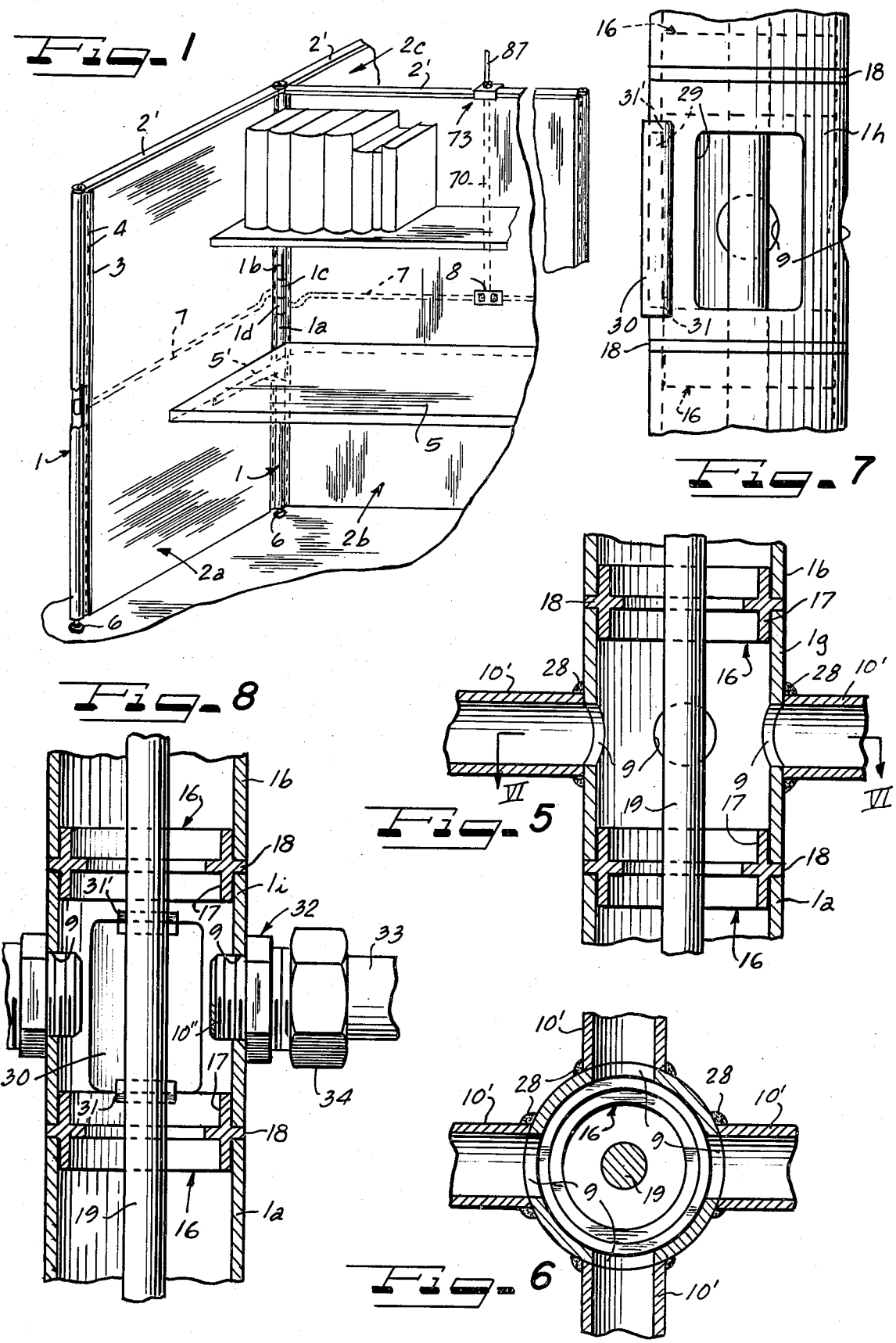

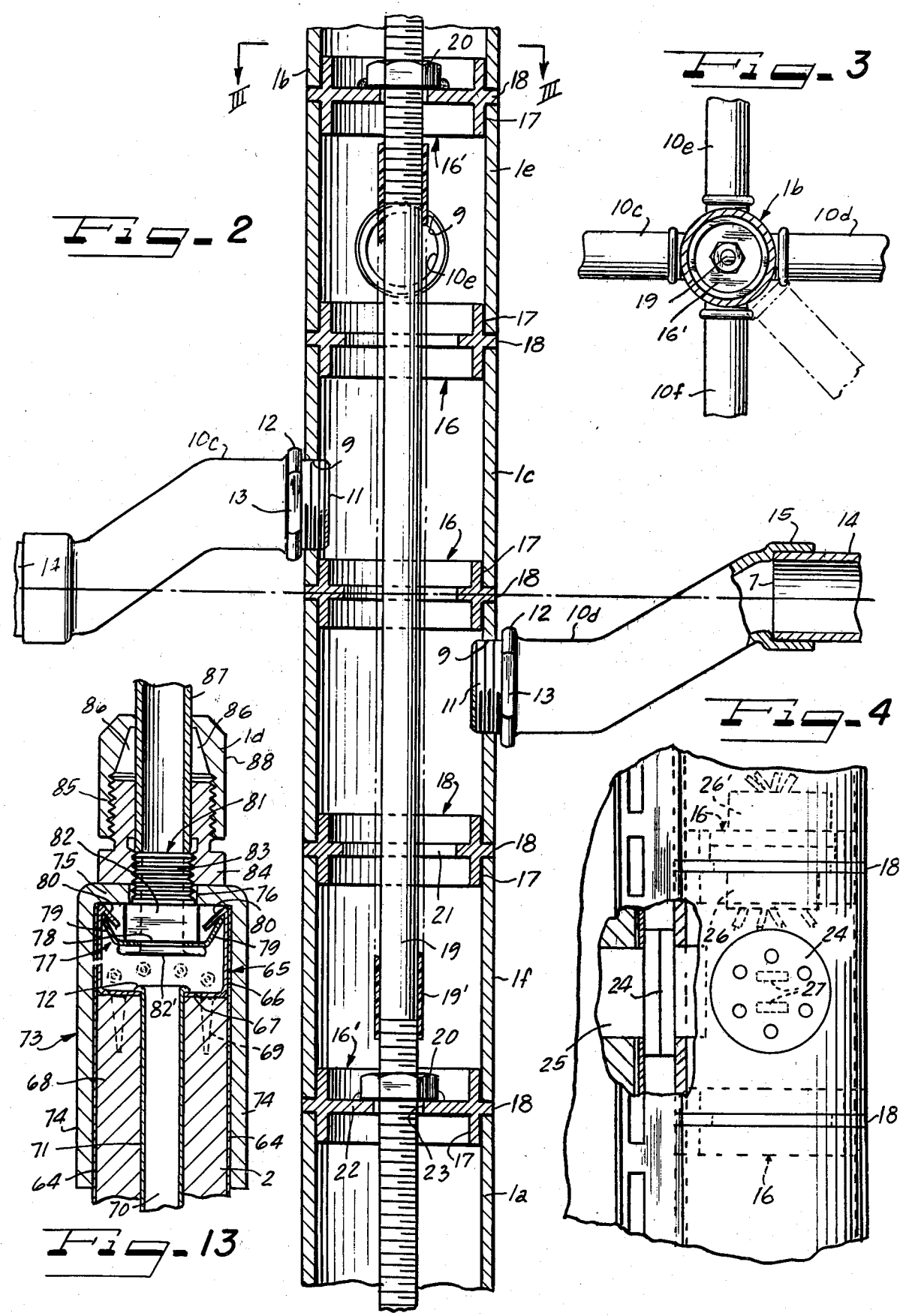

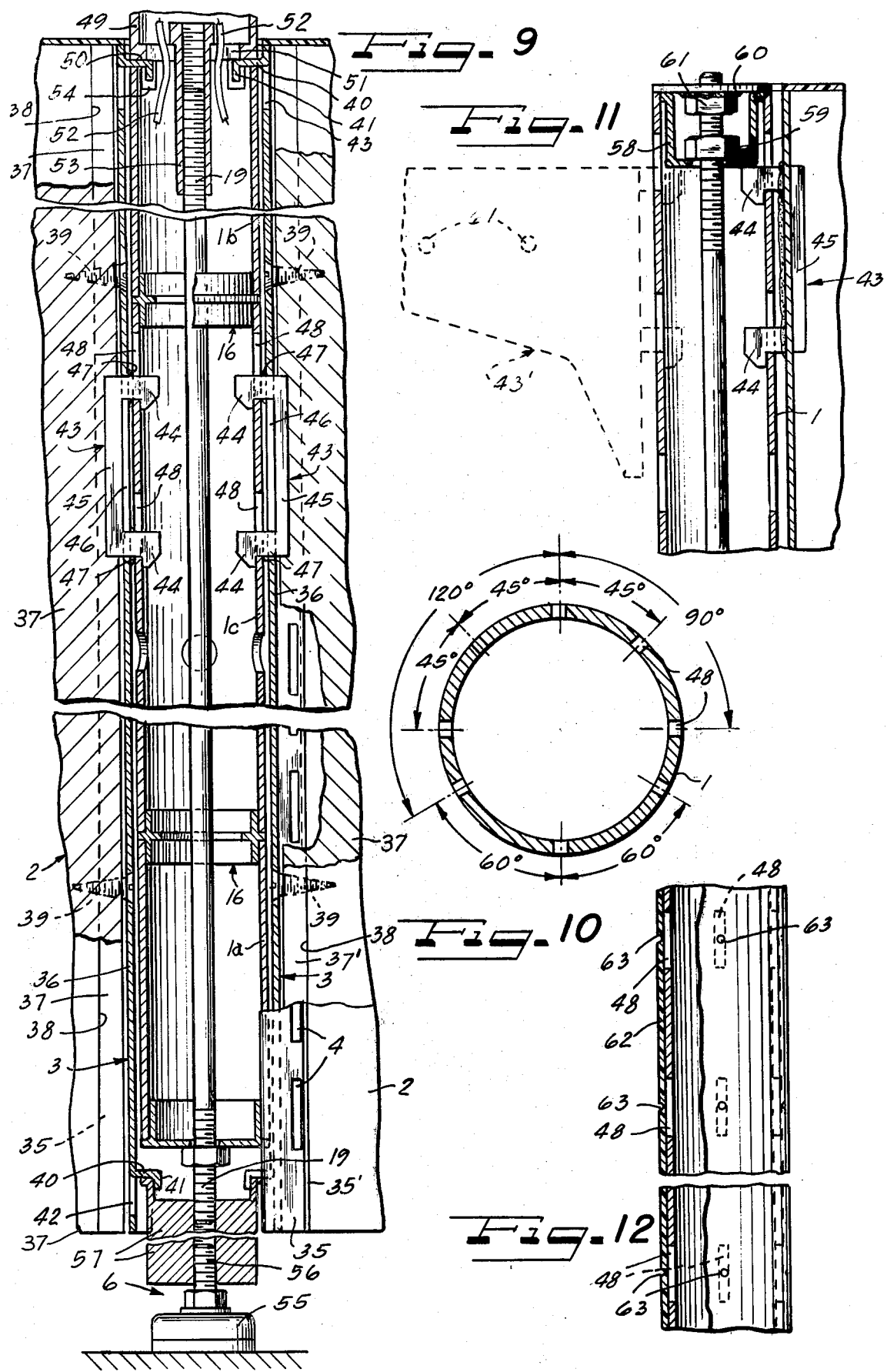

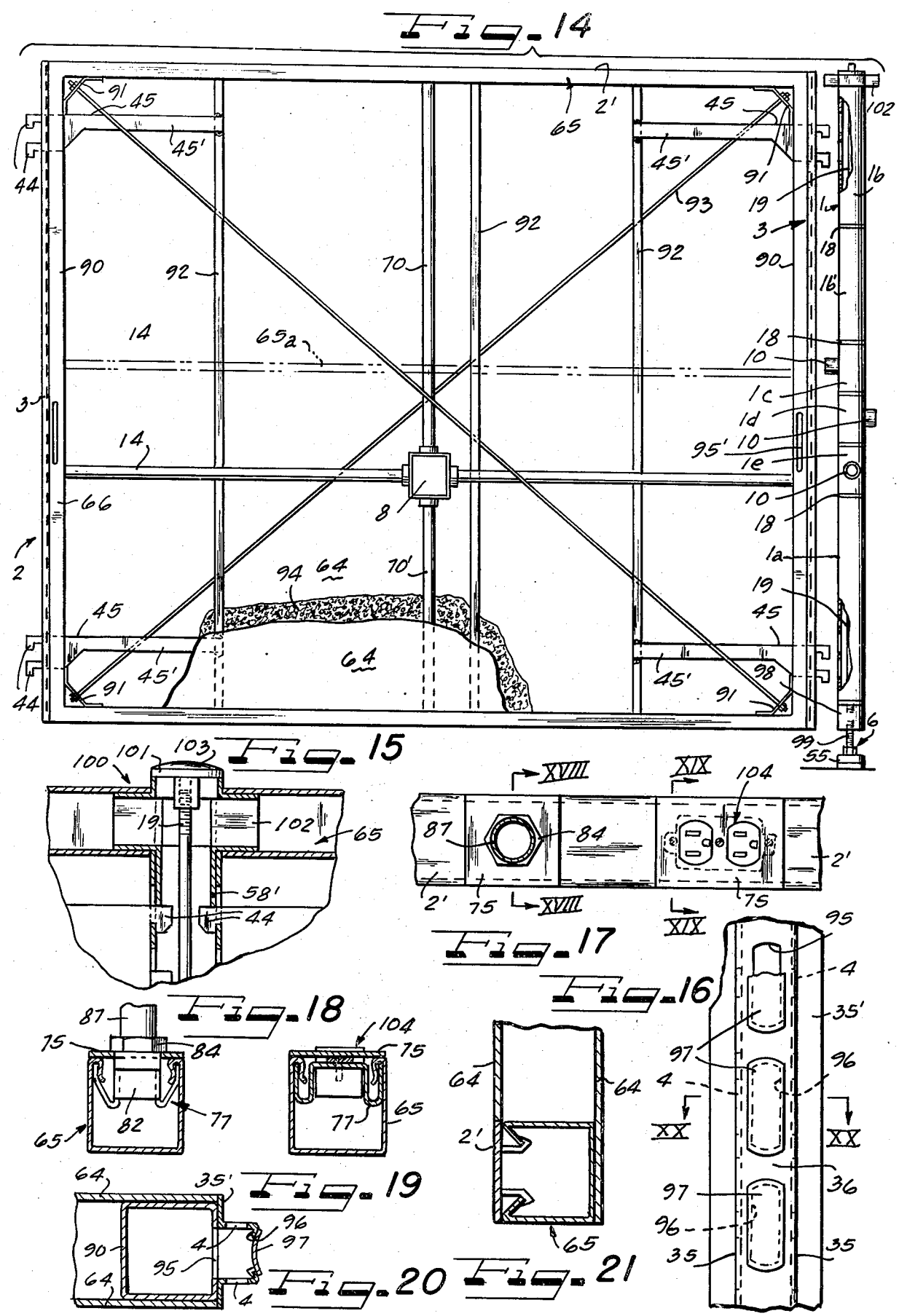

ELECTRICAL CONNECTION SYSTEM FOR PANEL STRUCTURES

BACKGROUND OF THE INVENTION

The present invention relates to partition structures and the like, particularly to those employing wall panels and cooperable supporting columns, for effecting electrical connections between respective wall panels of a partition structure.

While partition structures of the portable or assembled type, as distinguished from permanent partition walls, have been utilized over many years, with improvements in construction and installation techniques, etc., such use has rapidly expanded and partition structures of this type are now extensively employed in office buildings, industrial plants, etc. Various different constructions have evolved with respect to fabrication and modes of installation. In most instances the panels are connected one to another through suitable means, with some arrangement usually being provided whereby various combinations of assemblies may be utilized involving adjoining as well as intersecting panel structures.

While such wall structures have the advantage of comparatively low cost, simplicity of installation and flexibility in wall arrangements, they do present problems in connection with electrical supply thereto. In the present advanced state of the commercial world, electricity plays a greater and greater part in every day business operations over and above that employed merely for illumination. With electric typewriters, dictating machines, copy machines, radios, intercoms, etc. provisions for the supply of electricity becomes of great importance in the use of partition walls of the type referred to as it is substantially essential that each room or space defined by the partition structures be adequately supplied with electricity. While the electrical supply lines may be relatively readily run to the partition walls, for example from above, below, or from a normal side wall, the distribution of power therefrom often presents problems. One solution has been to run overhead wiring above a false ceiling to the various locations requiring power outlets and then extend a line through a suitable column structure or the like from the ceiling to substantially each partition structure. In like manner lines may be run below floor to the desired outlet points and then brought up to the partition walls. However, either of these arrangements involve fixed predetermined separate wiring, which not only is expensive but tends to defeat the principal advantage of such partition walls with respect to flexibility of arrangement and location, and thus diminishes the ability to make changes in floor plans, etc. without material revisions in electrical supply.

BRIEF SUMMARY OF THE INVENTION

The present invention is directed particularly to partition wall structures employing wall panels which are adapted to be supported at their vertical edges by respective vertical columns, with the wall panels being readily secured to and detached from the columns, and in which two or more panels may be secured to a common column which thus forms the juncture point for the respective panels. In accordance with the invention, the wall panels may be provided with internal passageways, preferably employing thin wall conduit or other suitable structure which operatively connects one vertical edge of the wall panel with the other, through which the electrical conductors may run. The supporting column for the panels may comprise a suitable hollow tubular member, of suitable cross-section, to which the panels are connected for support thereby, and which is provided with access openings suitably positioned to communicate with the passageway in the panel, whereby electrical conductors may operatively extend through the wall panels, with the column thereby forming the connecting conduit therebetween.

In one form of the invention, the arrangement is such that the portion of the column carrying the structure for the electrical conductors is adjustable with respect to the vertical axis of the column, so that it may be adjusted to accommodate different angular relationships between the wall panels, i.e. in line, at right angles, or at intermediate angles. In addition, the structure can be so designed that it can accommodate the electrical conductors of 2, 3 or 4 panels at their common intersection point.

The design is exceedingly flexible and enables the panels to be prewired if so desired, employing plug-in or other suitable connections between panels or provides merely the various passageways through the panels which may then be wired at the time, or following of installation with the conductors being run as necessary, and if desired connected at the cooperable column by wire nuts, connectors or other suitable means.

The panels may be provided with outlet receptacle which communicate with the passageways in the panel, and outlet structures may be also provided directly on the column.

In a preferred embodiment of the invention, the column is constructed in a plurality of sections, intermediate sections being provided with suitable conduit or cable connectors through which the conductors may pass from a wall panel, with separate sections being provided for each wall panel whereby each such section may be rotated with an associated panel, permitting desired angular relations between adjacent panels without affecting the electrical connections therebetween. In this construction the respective individual sections may be maintained in proper vertical alignment by guide rings disposed therebetween and between the adjoining main sections of the column, with the various sections being secured in assembled relation by suitable means, as for example a threaded rod extending through the column and connected thereto by suitable fittings.

In another form of the invention the upper edge portions of the panels are constructed to enable electrical conductors to be run therealong for connection to a power supply or for supplying electricity to lamp fixtures, clocks and the like, which may be supported in novel manner from the top portions of the panels.

In another embodiment of the invention power may be supplied from above to the top of a panel supporting column.

In a further form of the invention, the panel may have conductor passages along all or selected edges of the panel, i.e. top, bottom and edge walls, providing complete flexibility with respect to the paths therein and the connections thereto, both the supply thereto and the supply to other fixtures associated therewith, as well as connections between panels. Such panel-to-panel connections may be disposed at the top, bottom or intermediate portions of the supporting column.

In addition to the features with respect to the electrical wiring, the present invention also provides a very efficient arrangement of supporting the wall panels from the column whereby a very strong and rugged connection is provided between the wall panels and the column structures.

BRIEF DESCRIPTION OF THE DRAWINGS

In the drawings wherein like reference characters indicate like or corresponding parts:

FIG. 1 is a perspective view of a plurality of wall sections meeting at a common intersection point and illustrating the general association of the electrical conductor structure therewith;

FIG. 2 is an axial sectional view through a column structure such as illustrated in FIG. 1;

FIG. 3 is a section through the column illustrated in FIG. 2 taken approximately on the line III—III of FIG. 2;

FIG. 4 illustrates a portion of a column in which plug-in connections are provided for completing the connections between panels and column;

FIG. 5 is an axial sectional view similar to FIG. 2 illustrating a modified form of construction;

FIG. 6 is a transverse sectional view taken approximately on the line VI—VI of FIG. 5;

FIG. 7 is an elevational view of a portion of a column illustrating the use of personnel or manual access openings and cover structure therefor;

FIG. 8 is a sectional view similar to FIGS. 2 and 5, illustrating a further constructional embodiment;

FIG. 9 is an axial sectional view through a column and adjacent panel structures illustrating the utilization of novel means for providing connections between wall panels and a column, which may make use of fittings of the type employed in connection with the electrical connections;

FIG. 10 is a transverse section through a column such as illustrated in FIG. 9, showing an example of slot configuration which may be employed;

FIG. 11 is a sectional view of the upper portion of a column illustrating the adaptation of the mounting structure of FIG. 9 to an end portion of a panel and column structure;

FIG. 12 is an elevational view of a portion of a column such as might be used with the arrangement of FIG. 9 with portions of the column shown in section to bring out the details thereof;

FIG. 13 is a sectional view through the upper edge of a wall panel illustrating a further feature of the invention for supplying a panel directly with power from above, or for supporting a lamp fixture therefrom, as well as supplying power thereto;

FIG. 14 is a face view of a panel, with the facing thereof broken away to show details of internal construction, and a cooperable supporting column;

FIG. 15 is a sectional view through the top portion of a supporting column and portions of two panels assembled therewith;

FIG. 16 is an elevational view of a portion of a vertical edge of the panel of FIG. 14;

FIG. 17 is a top plan view of a portion of the top edge of a panel, such as illustrated in FIG. 14, illustrating an outlet socket therefor and supply connection thereto;

FIG. 18 is a sectional view taken approximately on the line XVIII—XVIII of FIG. 17;

FIG. 19 is a sectional view taken approximately on the line XIX—XIX of FIG. 17;

FIG. 20 is a sectional view taken approximately on the line XX—XX of FIG. 16; and FIG. 21 is a transverse sectional view through a modified channel structure, which may be employed in a panel such as illustrated in FIG. 14.

DETAILED DESCRIPTION OF THE INVENTION

Referring to the drawings, and more particularly to FIG. 1 which illustrates the general construction and arrangement of partition walls to which the invention is particularly applicable, the reference numeral 1 indicates generally respective vertically extending columns, one of which is illustrated as supporting a plurality of wall panels 2a, 2b and 2c at their juncture. In a commercial form of such structure, the panels are connected to the column 1 by projections extending outwardly from the vertical edges of the channels adjacent the top and bottom ends of a column, which projections terminate in downwardly depending flange portions that are interlocked to the column by means of cooperable elements carried by the latter, with the partition walls thus being supported from such projections. Projections of this type are illustrated in connection with the disclosure of FIG. 9 and will be hereinafter described in detail in connection with other features of the invention.

Extending along the vertical end portions of each panel is a metallic member 3 in the form of an elongated strip having a series of elongated slots 4 therein, constructed to receive cooperable interlocking elements of a shelf-supporting bracket 5' adapted to provide support for a shelf 5. Each column 1 is adapted to be supported from a floor surface by a leg member 6, which preferably is adjustable to enable easy levelling of the wall structures. The construction thus far described is conventional, and where electrical connections are required, they may be provided by overhead connections, i.e. so-called flexible "umbilicals", i.e. supply cables which contain the electrical supply conductors. Usually, wherever possible, the supply line or umbilical, which may contain both electrical, telephone, cable circuitry or other power requirements, is connected to a suitable panel which may extend vertically and serve one or more areas without additional wiring. Where other outlets are required at locations intermediate such supply lines, they may be wired in the usual manner following installation, utilizing thin wall conduit, outlet boxes, etc.

In accordance with one embodiment of the invention, the wall panel may be provided with a horizontally extending passageway 7 which may extend from vertical edge to vertical edge of the associated panel and may merely provide wiring connections from edge to edge or may be provided with an outlet 8 at any desired point therealong, as illustrated in FIG. 1. In the construction therein illustrated, which represents one embodiment of the invention, the column 1 is divided into a plurality of sections 1a, 1b, 1c and 1d with the respective sections 1c and 1d being adapted to receive wiring from the passageways 7 which may, for example, be connected within the column 1, and thus provide conductors running continuously from the free edge of the panel 2a to the free edge of the panel 2b. In the construction illustrated, the section 1c is adapted to pivot about the axis of the column 1 with changes in angular relation of the wall panel 2a relative thereto, and in like manner the section 1d is adapted to pivot with the wall panel 2b whereby the electrical connections involved do not materially restrict relative angular adjustment between panels 2a and 2b.

FIGS. 2 and 3 illustrate details of such a column structure, and in addition thereto illustrate the use of two additional intermediate sections 1e and 1f, whereby electrical connections for four wall panels may be accommodated. Each of the sections 1c-1f is provided with a conductor-receiving access opening 9 therein (that in the section 1f being assumed to be facing the observer as viewed in FIG. 2), and each is adapted to have connected thereto a suitable conduit fitting 10c, 10d, 10e and 10f. In the embodiment illustrated the fittings 10 are provided with threaded ends 11 adapted to be threaded into the respective openings 9. To facilitate attachment to the associated section, each of the fittings 10 may be provided with a flange 12 having flats 13 thereon for engagement with a suitable wrench or the like. The opposite end of each fitting 10 is adapted to be aligned with the passageway 7 of an associated wall panel (not illustrated in FIG. 2), which passageway is illustrated as being defined by a conduit member 14, the adjacent end of which is adapted to be received in an enlarged end portion 15 of the associated fitting 10. As illustrated, the threaded end 11 of each fitting 10c and 10d is offset with respect to the opposite enlarged end 15 thereof whereby, upon reversing the orientation of one section with respect to the other, the outer ends 15 of the two fittings may be disposed on a common axis.

Where additional connection sections 1e and 1f are employed, the fittings 10e and 10f associated therewith may, for example, be provided with a correspondingly greater offset than the fittings 10c or 10d to bring the opposite enlarged ends 15 thereof on a common center line lying in the plane of the center line of the fittings 10c and 10d.

In the construction illustrated in FIG. 2, each adjacent pair of sections 1c-1e of the column 1 are spaced by respective sleeve members 16, each of which has a tubular portion 17, the external diameter of which is approximately equal to the internal diameter of the column, with such tubular portion having an outwardly extending annular flange 18 substantially centered between the upper and lower edges of the member 17, with such flange having an external diameter substantially equal to the external diameter of the column. The various sections of the column may be maintained in assembled relation by suitable means, as for example a threaded rod 19 upon which are threaded respective nuts 20, each rigidly mounted on an end member 16'. The members 16' have a configuration generally corresponding to the members 16 with the exception that the latter are respectively provided with relatively large central openings 21 therein for the passage of electrical conductors, whereas the members 16' are respectively provided with a transversely extending inner wall 22 having a relatively small opening 23 therein for passage of the rod 19 therethrough. The members 16 and 16' maintain the various sections of the column in accurate axial alignment and, by turning the members 16' in the proper direction, the sections 1c-1f may be secured in axial fixed relation, while at the same time permitting rotative movement of the members relative to one another.

In use, the electrical conductors may be run through the various passageways 7 and extended through the column from one fitting 10 to another. This can be readily accomplished by suitably feeding the conductors through the desired passageways, as for example in connection with the assembly or at least partial assembly of the respective column sections, or in the manner hereinafter described.

Preferably the rod 19, at least in the vicinity of conductors within the column, is provided with a covering of insulating material, for example an insulating sleeve 19' or a suitable wrapped, molded or sprayed insulation.

While the conductors may be run directly through the conduit from one panel to the other, or connected at the columns, with such wiring taking place, for example, at time of installation, it is also possible that the connection between panels and column may be effected by other means, for example, plug and socket connectors. Such a construction as illustrated in FIG. 4, in which the column is illustrated as being provided with female socket members 24, carried by one or more column sections, FIG. 4 illustrating the use of two such socket members on a single column section. In such case the end 11 of the respective fittings 10 would terminate in a cooperable plug member 25 adapted to be inserted in one of the sockets carried by the column. As in the construction illustrated in FIG. 2, the respective connecting plugs may be offset similar to the fittings 10c and 10d of FIG. 2. In addition, as illustrated in dotted lines, a socket 24 could be interconnected with a socket disposed on another column section by means of two connector members 26 and 26', one of which maybe a socket member and the other a plug member.

Also, as illustrated in FIG. 4, one or more of the connector members 24 may be in the form of an ordinary outlet socket having openings 27 indicated in broken lines, for the reception of the usual grounded cord plug or the like.

Instead of providing a plurality of column sections, each of which is adapted to be connected to an associated wall panel, in some installations it may be desirable to utilize only a single intermediate column section, with all of the various conductor-receiving access openings being provided in the single column section, and with their respective axes in fixed relation relative to one another. With such a construction, which is particularly adaptable to installations in which the wall panels will, for example, normally be disposed at right angles to one another with two or more panels having a common supporting column, interchangeable column sections may be provided with the access openings arranged at different desired intervals about the axis thereof as required.

Such a construction is illustrated in FIG. 5 wherein the sleeve 1g is disposed between adjacent column sections 1a, 1b with respective spacers 18 interposed therebetween and the assembly secured together by a rod 19. In this construction four access openings 9 are provided, each of which has a fitting 10' rigidly secured thereto, as for example by a welding bead 28 or other suitable arrangement, whereby the fittings 10' extend in fixed angular relation.

In this construction, the sections 1g can be made up with any desired number of fittings 10' and with the fittings at different angles. For example, a column section could be provided with two fittings 10' disposed at 90° with respect to one another, another section with two fittings disposed to 180°, a third with three fittings disposed at 90° from one another or a fourth with four fittings each disposed at an angle of 90° with respect to the adjacent fittings. The latter construction is illustrated in FIG. 6.

Where the wiring is to be run directly from one wall panel to the other, or where individual conductors are brought into the column from each panel and connected within the column, for example by means of wire nuts or other suitable means, it may be desirable to incorporate a personnel or manual access opening in the column section for facilitating either the feeding through or connection of the respective conductors. Such a construction is illustrated in FIGS. 7 and 8 in which the section 1h of FIG. 7 is provided with a pair of conductor access openings 9 disposed at right angles to one another and a pair of manual access openings 29, likewise disposed at 90° to one another, with the openings 29 being adapted to be closed by respective cover member 30 of suitable material, for example a plastic (only one of which is illustrated in FIG. 7), which may be secured in place by any suitable means as for example, a hook member 31 and map-in member 31' integrally formed therewith. FIG. 8 illustrates a similar construction in which the column section 1i is provided with aligned conductor access openings 9 and at least one manual access opening 29 and cover 30.

FIG. 8 also illustrates the use of a fitting 10" which is in the form of a thin-wall connector 32, threaded into the column section 1i which receives the adjacent end of a thin-wall conduit 33 which is secured in position by a clamp nut 34.

FIGS. 9–11 illustrate an additional feature of the invention, in conjunction with the connector structure heretofore described, to provide a stronger and more rigid connection between the wall panels and the supporting column, as well as provide direct support for shelving and the like.

FIG. 9 additionally illustrates in detail a typical form of support between present commercial wall panels and cooperable supporting column previously generally described. In the commercial construction, the adjacent vertical edge of each wall panel 2, as previously mentioned, is provided with a metal reinforcing strip 3, generally illustrated in FIG. 1 with respect to the panel 2b, each reinforcing strip is generally U-shaped in transverse cross-section having a pair of generally parallel spaced walls 35 connected at their outer edges by a concave wall 36 which is generally concentric with the outer circumference of the column 1. The spacing between opposite walls 35 is less than the spacing between the opposite faces of the wall panels and the opposite edges of each wall 35 terminate in respective outwardly extending flanges 35', the free outer edges of which are spaced a distance substantially equal to the thickness of the wall panel 2. The vertical edge of the latter, i.e. the core 37 thereof, is provided with a central longitudinally extending tongue 37', forming a shoulder 38 adjacent each face of the wall panel, with each flange 35' of the member 3 seated on a respective shoulder. The members 3 are rigidly secured to the associated wall panel by suitable means such as screws 39 extending through the intermediate concave portion 36 of the strip 3 and into the core 37 of the wall panel, which, for example, may be constructed of wood, metal or other suitable material.

Formed from struck out portions of the respective intermediate connecting portions 36 of each strip 3 are respective mounting tongues or projections 40, the free ends of which terminate in downwardly directed flanges 41, two of such projections being provided on each strip 3, one adjacent the top edge of the panel and the other adjacent the bottom edge of the panel. In the commercial structure, such tongues form the sole means of support between the wall panel and the supporting column therefor. As the metal forming the strip 3 is relatively thin and the wall panels may carry a comparatively heavy load, there may be a tendency for the tongues to shear or tear along their outer edges, i.e. to extend the slot 42 from which the tongues 40 were formed.

FIGS. 9 through 12 illustrate the use of relatively heavy connecting members which provide a much more rigid and durable support between the wall panel and the supporting column. In this construction, each wall panel is provided with at least one hanger member, indicated generally by the numeral 43, illustrated in FIG. 9 as comprising a pair of hook portions 44 connected by an intermediate portion 45 with the hanger 43 being disposed in a slot 46 in the intermediate wall 36 of the strip 3 and rigidly welded thereto as indicated at 47. As illustrated, the column 1 comprises three sections 1a, 1b and 1c with the section 1c being provided with slots 48 adapted to receive the portions 44 of the hangers 43. The opposite panel 2 is provided with a similar hanger and similarily engaged in corresponding slots in the column section. In this construction, the tongues 40 serve primarily to maintain the wall panel in operative position with the weight of the panel being transferred to the column through the hangers 43. In the construction illustrated, the tongues 40 at the upper edge of the wall panels are retained in position by a generally cup-shaped member 49 having an annular lower portion 50 bearing on the top faces of the tongues.

FIG. 9 also illustrates an arrangement for supplying power to the column from the top end thereof. In such case, the member 49 may be provided with a plurality of radially directed inwardly extending spoke-like member 51 which form conductor-receiving passageways therebetween for electrical supply conductors 52, with the member 49 being secured in position by a hex-headed sleeve nut 53, threaded on rod 19.

In the construction illustrated, the member 49 has downwardly depending projections 54 which extend on each side of the tongues 40 thereby preventing rotation of the member 49. The upper end of the latter may be suitably constructed for connection to a suitable conduit, cable, etc., i.e. a so-called "umbilical" supply line, which could contain power, phone and other desired service lines.

The opposite end of the rod 19 may carry a foot member 6 comprising a floor-engaging member 55 carried by a short length of threaded rod 56. The latter, in turn, is threaded into a sleeve member 57, into the upper end of which is threaded the free end of the rod 19. In the construction illustrated the upper end of the member 57 is enlarged to engage and lock the projections 40 in operative position.

FIG. 11 illustrates a modified construction of that of FIG. 9, in which hangers 43 supply the entire support for the wall panel, at least two such hangers being provided, one adjacent the top edge of the panel and the other adjacent the bottom edge of the panel, in a manner similar to the tongues 40. In this construction, the panels are locked in assembled relation by an internal sleeve 58 having its bottom face resting on the upper edge of the hanger 43 and locked in position by a nut 59 threaded on the shaft 19. The upper end of the column is closed in this case by a cap member 60 comprising a disc having a nut 61 secured thereto and threaded on the rod 19. However, the locking structure of FIG. 9 likewise could be employed for the supply of electrical conductors thereto.

Instead of the hanger 43 being welded to the end strip 3, the hanger may be of elongated construction, such as the hanger 43', illustrated in broken lines in FIG. 11, in which the hanger may, for example, be inserted in a slot formed in the core 37 of the associated panel, with the upper edge of the hanger engaged with the top edge of such slot. In addition, the hanger may be secured by other suitable means such as transversely extending screws 61 extended through the hanger and imbedded in the core of the wall panel.

The column section, provided with slots 48, may be an individual section of the entire column and provided with one or more pairs of slots for the reception of the hook members 44, with each pair of slots being circumferentially spaced about the periphery of the column section. Thus, FIG. 10 illustrates, in transverse cross-section, a column section 1 having a plurality of pairs of slots 48 therein, only one of each pair being illustrated, with the angular relation of the respective slots varying from 45° apart to 120° apart, whereby wall panels may be supported on the column at various angles from multiples of 45°, to multiples of 60°, or combinations of 45° and 60°. However, as in the previous constructions, the column supports may be fabricated with various numbers of slots at different angular relationships whereby a desired panel relationship may be achieved by employing a column support having the desired number of pairs of slots at the desired angular relationships.

Where 90° angles are involved between adjacent panels, the column section may be provided with appropriate pairs of slots disposed at 90° apart, with the entire column being enclosed by a plastic or other suitable cover 62, as illustrated in FIG. 12, which covers the various pairs of slots 48. As illustrated, the cover 62 is provided with suitable means such as an indentation 63 at each slot 48. Thus, in use the plastic covering is removed at the selected indentations to uncover each desired pair of slots 48, with unused slots remaining covered. Consequently, the column is of more or less universal construction enabling the connection of from 1 to 4 panels therewith with unused slots 48 being concealed.

FIG. 13 illustrates in section, the upper edge portion of a wall panel provided with means for supporting a lamp structure, as well as means for supplying electrical current thereto, and which, in addition may be utilized for connection of an "umbilical" supply line to the panel substantially anywhere along the upper edge thereof.

In this construction the upper edge of the panel 2, which is provided with suitable facings 64, is defined by a channel member 65 having a pair of spaced upwardly extending side walls 66 connected at their lower edges by an intermediate wall 67, with the channel member being firmly secured to the top edge of the core 68 of the panel by a plurality of screws 69 or other suitable means. As illustrated, the facings 64 may extend up along the side walls 66 of the channel and thus conceal the same. Likewise, as illustrated in FIG. 1, a passageway 70 may be formed in the panel extending between an outlet 8, a junction box, or an elongated outlet strip, and the upper edge of the panel, which passageway may be defined, for example, by a conduit 71, which as illustrated in FIG. 13 may extend through the bottom wall of the channel and be provided with a flared end 72. Thus, electrical conductors may be extended between the outlet 8 and the channel 65, either for supplying power to the upper edge of the panel from the outlet 8, or supplying power from a suitable source to the outlet 8.

Extending over the top edge of the panel 2 is a saddle member, indicated generally by the reference numeral 73, of inverted U-shape in transverse cross-section, having leg portions 74 closely engaging the adjacent faces of the panel, which leg portions are connected by an intermediate portion 75 having a hole 76 therein.

Disposed within the channel is a cooperable retaining member, indicated generally by the numeral 77, which comprises a plate-like portion 78 having upturned longitudinal edge portions 79. The saddle member 73 and member 77 may be co-extensive in length with the portion 78 being provided with a hollow connector member, indicated generally by the numeral 81, the latter comprises a base portion 82 secured to the portion 78 of the retaining member 77 by suitable means, as for example by an extension of a portion, preferably cylindrical, of the base member through an opening in the portion 78 of the retaining member 77. The edge portions of such portion may be flared or wedged over, as indicated at 82' to securely clamp the member 77 therebetween. Extending upwardly from the base member and integrally formed therewith is an externally threaded nipple 83, upon which is threaded a retaining nut 84 operable to rigidly secure the member 77 and saddle member 73 in operative positions. The upper portion of the retaining nut 84 may be provided with a threaded portion 85 terminating at its upper end in conical shaped clamping elements 86, generally corresponding to those formed on the usual thin wall conduit connector member, which are adapted to securely clamp the lower end of a conduit 87 to the saddle member and associated structure, with such clamping action being derived from a clamp nut 88 threaded on the portion 85 of the nut 84. Where a saddle member is employed, the trim or cap strip 2' of the panel would be suitably cut or formed to remove the portion thereof corresponding to the saddle member.

It will be appreciated that as the channel member 65 may extend along the entire upper edge of the wall panel, the saddle member 73 may be disposed anywhere along such upper edge. Likewise, irrespective of the disposition of the saddle member and associated structure, power and other lines may be run from the latter to the passageway 70 with such conductors laying along the bottom of the channel 65. While the structure illustrated in FIG. 13 is particularly adapted for use in the connection of supply lines to a panel structure it is equally utilizable as a supporting structure for lamp fixtures or other electrical objects, in which case the nut 84 could be formed integrally with a suitable vertically extending column, operative to rigidly secure such column to the saddle member and at the same time clamp the latter firmly in position on the top edge of the panel, with the lamp fixture or other object being suitably supported by the column. One or more columns may be employed as necessary or desirable.

While the features of the invention above described have been directed primarily to additions to and modifications of panels involving general constructions corresponding to those currently in commercial use, FIGS. 14–21 illustrate the incorporation of such features of the invention to a wholly redesigned panel structure and incorporate further additional features.

FIG. 14 illustrates a side or face elevational view of a panel and cooperable supporting column, with the facing or covering of the face of the panel removed to illustrate details of the internal construction thereof. Constructional components illustrated in FIGS. 14-21, so far as applicable, carry the same reference numerals as the corresponding components previously described in connection with the preceding figures.

Referring to FIG. 14, the panel 2 is designed as a fully fireproof structure comprising a rectangular frame structure composed of a pair of top and bottom channel members 65 defining the upper and lower edges of the panel, connected at their respective ends by tubular end members 90. As illustrated in FIG. 20, the members 90 are of rectangular configuration in transverse cross-section, to the exposed end faces of which are secured the members 3, which may be of a construction substantially the same as that illustrated in FIGS. 1 and 9, each such member containing a series of slots 4 in the walls 35 thereof. The member 3 may be secured to the member 90 by any suitable means, as for example spot welding or the like.

The frame structure comprising members 65 and 90 may be suitably reinforced by additional members, illustrated in FIG. 14 as comprising diagonally extending corner members 91, vertically extending intermediate studs 92, and diagonally extending elements, such as rods 93, having their ends secured to the corner members 91. Depending upon the design and proportions of the panels, any one or more of the reinforcing elements may be employed as deemed necessary or desirable. The respective reinforcing members may be secured at their ends to adjacent members and adjacent intermediate portions of other reinforcing elements by welding or the like. Where angle rods 93 intersect the respective studs they may be extended through openings formed in such studs, with the respective angle rods disposed in different planes to prevent interference therebetween. Likewise, the ends of the studs may be welded or otherwise suitably secured to the respective channel members 65. Similarly, the conduits 14 and 70 may be suitably secured at their ends to the respective cooperable members 90 and 65, with the conduits 14 extending through openings in the studs 92 as required.

Rigidly secured to the frame structure described, are respective hangers 45 carrying hook portions 44, with the hangers illustrated having extensions 45' extending to the adjacent stud 92 and secured by welding or other suitable means to the associated studs, members 90 as well as to the members 3 and diagonal rods 93, as may be deemed expedient. In the construction illustrated, the conduits 14 and 70 meet at the junction box 8, which may, for example, comprise a so-called 1900 box which is open at both sides, whereby the panel facing may be provided with an opening therein, as desired, at either side of the panel and provided with a suitable outlet socket or the like, or a channel-type electrical strip accommodating a plurality of electrical devices.

The interior of the panel structure may be suitably filled with suitable material 94, as for example a sound absorbing material adapted to reduce sound transmission from one side of the panel to the other.

The column 1 illustrated in FIG. 14 is constructed in a plurality of sections 1a, 1b, 1b', 1c, 1d and 1e, separated at their respective junctures by fittings 18, as illustrated in FIG. 2, with the sections 1c and 1d, each being provided with a fitting 10 adapted to cooperate with a respective panel. In like manner, the fitting 1e may be provided with a fitting 10 for cooperation with a third panel which would extend, for example, at right angles to the panel illustrated. As illustrated in FIGS. 16 and 20, the tubular member 90 as well as the member 3 may be provided with a plurality of openings 95 and 96 respectively which are disposed at heights along the member 3 corresponding to the disposition of possible fittings 10 carried by the column whereby any pair of openings 95 and 96 may be utilized for running conductors from a panel to a column. The openings 96 may be suitably covered by detachable cover members 97 which may be of a construction similar to the cover members 30 and adapted to be snapped into or out of engagement with the respective member 3.

The various sections of the column 1 are adapted to be retained in operative position by a rod 19 partially or completely threaded along its length. The lower end of such rod is threaded into a cylindrical member 98 forming a part of the foot assembly 6, comprising the member 55 which is carried by a threaded rod 99, the upper end of which is likewise threaded into the member 98. Thus, by relative adjustment of the rod 99 and possibly the member 98 with respect to the rod 19, adequate adjustment of the height of the column may be effected.

Disposed at the top of the column 1 of FIG. 14 is a connector member 100 which, as illustrated in FIG. 15, comprises a generally cylindrical portion 101 from which extend a plurality of hollow tubular members 102, the number of such members corresponding to the number of panels which are to be supported by the column involved, and which are to be connected for the passage of conductors therebetween. The tubular members 101 and 102 are proportioned to permit their insertion into the end of the adjacent channel member 65 to complete communication from one channel member to the other. The member 100 may be locked in position by suitable means, as for example, a cap member 103 threaded on the adjacent end of the rod 19. To facilitate the locking of the member 103 on the rod, the top face of the member may be provided with a hex recess or other suitable means for engagement with a suitable tool.

As illustrated in FIG. 15, a sleeve member 58' open at both ends and having an external diameter just slightly smaller than the internal diameter of the adjacent column section may be disposed between the member 100 and the hook members 44 of the hangers 45 whereby upward movement of the panels relative to the column and thus disengagement thereof is prevented.

As illustrated in FIGS. 17, 18 and 19, the top channel 65 may carry a power supply connection similar to that illustrated in FIG. 13, in which merely a relatively flat member 75, corresponding to the top portion of the saddle member 73 of FIG. 13, is utilized. In like manner, an outlet socket 104 of standard construction may be mounted in the channel 65 by means of a suitably configurated clip member 77 and the cover plate 75 secured to the outlet as clearly illustrated in FIGS. 17 and 19. As illustrated in FIG. 17, the top cover strip 2' may be suitably cut or otherwise formed into a plurality of sections to complete the enclosure of the channel 65.

It will be appreciated that the structures of FIGS. 17-19 can likewise be employed with the bottom channel 65 as well as the top channel.

As illustrated in FIG. 21, either or both of the channels 65 may be disposed with their open side extending vertically instead of horizontally. Thus, in FIG. 21, the bottom channel 65 has its open vertical side adapted to be closed by a cover member 2' constructed of suitable material and adapted to be snapped into position.

It will be appreciated from the description of FIGS. 14–21 that the constructions therein illustrated provide all the features of strength and durability of the structures previously described, the feature of being able to extend the electrical conductors through and between adjacent panels utilizing the column as a connector therefor, and in addition thereto provides considerably greater flexibility in the arrangement of electrical conductors in the panel by permitting such conductors to be run either at the top, the bottom, either end or through the panel from top to bottom or end to end, as well as permitting full freedom of disposition of electrical outlets, electrical supplies and lamp fixtures, etc., at any convenient location along the top and bottom panel edges, or an intermediate location.

Also, as previously mentioned, this construction is completely fireproof.

It will also be appreciated that, if desired, access openings 95' also may be provided at the side of the members 90 for facilitating the running of conductors into conduit 14 etc. Such opening may be closed by a suitable snap in cover member similar to the cover members 97 illustrated in FIG. 16.

It will be appreciated that the various arrangements shown and described may be utilized in different combinations. Thus, for example, the construction of FIG. 13 could be utilized at the bottom edge of the panel, for power supply from below, as well as above, and in either case panel-to-panel connection could be effected by use of structures such as illustrated in FIGS. 2–8, disposed adjacent the cooperable channels. Likewise, the column may be utilized, as illustrated in FIG. 9, to provide the power line connections to the channel structures. Where the channel structures are employed with cooperable panel-to-panel connections and power supply, the passageways 7 and associated structures etc. may be eliminated.

Slots 48 also may be provided along the column for engagement with shelf brackets and the like, whereby shelves may be directly supported by the columns, thus eliminating any possibility of unloading the panel connections to the columns, as well as providing greater shelf strength.

It will be apparent from the above disclosure that I have provided a very efficient arrangement for supplying partition structures with electrical wiring, including the connection of supply lines thereto either to a supporting column of the wall structure or directly to a wall panel, as well as providing support and electrical supply to lamps and other structures which may be mounted on a wall panel.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. In a free standing, space dividing partition structure accommodating electrical conductors and employing a plurality of wall panels and cooperable elongated hollow supporting columns therefor, in which at least a pair of adjacent panels are supported, by a common column structure, at their vertical end edges by cooperable connecting means on said panels and said common hollow column structure, the combination of the hollow column structure having a plurality of access openings in the side walls thereof through which electrical conductors may extend from one wall panel of such a pair into the column structure and from the column structure into the other wall panel of such pair with the interior of the column structure forming a connecting conduit for such conductors between the respective wall panels of such pair, said column structure being constructed in the form of a plurality of aligned sections, at least one of which is rotatably adjustable relative to another about the column axis, said one section having at least one of said conductor access openings therein, and means for retaining such sections in assembled relation.

2. A partition structure according to claim 1, wherein each section is connected with an adjacent section by a sleeve member having an external diameter complemental to the internal diameter of the adjacent sections and provided with an outwardly extending circular flange intermediate its ends, disposed between and engaged with the opposing end edges of adjacent sections.

3. A partition structure according to claim 1, wherein at least one of said access openings is provided with a connector member to which electrical conductors within the column terminate, a cooperable connector member being associated with an adjacent wall panel, at which connector member, electrical conductors carried by such cooperable wall panel terminate, said connector members being operatively engageable to complete electrical connections between the electrical conductors associated therewith.

4. A partition structure according to claim 1, wherein said column structure is provided with means at the upper end thereof for the entry or exit of conductors to or form the column structure.

5. A partition structure according to claim 4, wherein said means at the upper end of a column is provided with means for at least partially supporting an object therefrom and possible electrical supply thereto.

6. A partition structure according to claim 1, comprising, in further combination, means detachably engageable with a wall panel along a laterally extending edge thereof, forming an entry or exit of electrical conductors, and a passageway along such edge of a wall panel for facilitating electrical connections of such conductors with other conductors carried by the wall panel.

7. A partition structure according to claim 6, wherein said means facilitating electrical connection of conductors comprises a channel member extending along such laterally extending panel edge in which connecting conductors may be disposed.

8. A partition structure according to claim 7, wherein said channel member is provided with cover means for effecting a closure of said channel.

9. A partition structure according to claim 1, wherein said wall panels are each provided with a channel member extending along a horizontal edge thereof for the reception of electrical conductors therein.

10. A partition structure according to claim 9, wherein said column structure is provided with an access opening therein adjacent said channel member for the conduction of electrical conductors within the channel member into the column structure.

11. A partition structure according to claim 9, wherein said access openings are provided in a hollow, end member connected to the column structure and disposed adjacent the cooperable channel member, said end member communicating with both such channel and the interior of the column structure.

12. A partition structure according to claim 9, wherein said channel member has a wall defining the corresponding edge of the wall panel and an open side adjacent thereto opening on a face of such wall panel.

13. A partition structure according to claim 1, wherein each of said panels is provided with conductor passageways along each edge thereof forming respective horizontal and vertical passageways for the reception of electrical conductors, the conductor access openings in the column structure being cooperable with access openings in at least one passageway adjacent the column structure for the conduction of electrical conductors between the respective wall panels and the cooperable column structure.

14. A partition structure according to claim 13, wherein an access opening in a wall panel is disposed in the adjacent vertical edge thereof.

15. A partition structure according to claim 14, wherein an access opening in a wall panel is formed by an open end of a laterally extending passageway.

16. In a partition structure accommodating electrical conductors and employing a plurality of wall panels and cooperable elongated hollow supporting columns therefrom, in which the vertical end edges of at least a pair of adjacent panels are supported by respective cooperable connecting means from a common hollow column, the combination of the hollow column structure having a plurality of access openings therein for the reception of electrical conductors from respective wall panels supported by the column, said column structure being constructed in the form of a plurality of aligned sections comprising respective end sections which are relatively stationary with respect to one another and a plurality of intermediate sections, each rotatable relative to the end sections, each of said intermediate sections having such an access opening therein, whereby the respective conductor access openings may be disposed in different angular relationships with respect to each other, with the interior of the column forming a connecting conduit for such conductors from the respective wall panels of such a pair, and means for retaining such sections in assembled relation.

17. A partition structure according to claim 16, wherein a pair of rotatable intermediate sections are disposed adjacent one another and each provided with an access opening therein, and a tubular member for each access opening secured to the associated section in alignment with the access opening thereof, each tubular member being provided with an offset therein, the respective offsets each extending toward the other section whereby the axes of free ends of the tubular members are disposed in a common plane, said tubular members forming conduit means for conductors extending through the associated access openings.

18. In a partition structure accommodating electrical conductors and employing a plurality of wall panels and cooperable elongated hollow supporting columns therefrom, in which the vertical end edges of at least a pair of adjacent panels are supported by respective cooperable connecting means from a common hollow column, the combination of the hollow column structure having a plurality of access openings therein for the reception of electrical conductors from respective wall panels supported by the column, said column structure being constructed in the form of a plurality of aligned sections at least one of which is rotatable relative to another about the column axis, said one section having at least one of said conductor access openings therein, a tubular member for each such access opening secured to the associated section in alignment with the access opening therein, said tubular member forming conduit means for conductors extending through the associated opening, with the interior of the column forming a connecting conduit for such conductors from the respective wall panels of such a pair, and means for retaining such sections in assembled relation.

19. A partition structure according to claim 18, wherein said tubular members are permanently secured to the associated sections.

20. A partition structure according to claim 18, wherein said tubular members are detachably secured to the associated sections.

21. In a partition structure accommodating electrical conductors and employing a plurality of wall panels and cooperable elongated hollow supporting columns therefor, in which the vertical end edges of at least a pair of adjacent panels are supported by respective cooperable connecting means from a common hollow column, the combination of the hollow column structure having a plurality of access openings therein for the reception of electrical conductors from respective wall panels supported by the column, the interior of the latter forming a connecting conduit for such conductors from the respective wall panels, said hollow column structure being provided, adjacent an opening for electrical conductors, with a further manual access opening therein, which is larger in area than that of the openings for said conductors, providing means for facilitating the wiring of said column structure, and cover means for closing said manual access opening.

22. In a partition structure accommodating electrical conductors and employing a plurality of wall panels and cooperable elongated hollow supporting columns therefrom, in which the vertical end edges of at least a pair of adjacent panels are supported by respective cooperable connecting means from a common hollow columns, the combination of the hollow column structure having a plurality of access openings therein for the reception of electrical conductors from respective wall panels supported by the column, said column structure being constructed in the form of a plurality of aligned sections at least one of which is rotatable relative to another about the column axis, said one section having at least one of said conductor access openings therein, with the interior of the column forming a connecting conduit for such conductors from the respective wall panels of such a pair, and means for retaining such sections in assembled relation, said hollow column structure being provided, adjacent an opening for electrical conductors, with a further manual access opening therein, which is larger in area than that of the openings for said conductors, providing means for facilitating the wiring of said column, and cover means for closing said manual access opening.

23. A partition structure according to claim 22, wherein said manual access opening is disposed on a rotatable section having an access opening therein for electrical conductors.

24. In a partition structure accommodating electrical conductors and employing a plurality of wall panels and cooperable elongated hollow supporting columns therefor, in which the vertical end edges of at least a pair of adjacent panels are supported by respective cooperable connecting means from a common hollow column, the combination of the hollow column structure having a plurality of access openings therein for the reception of electrical conductors from respective wall panels supported by the column, the interior of the latter forming a connecting conduit for such conductors from the respective wall panels, said wall panels are connected, at least in part, to the cooperable column structure by hanger members carried by the respective panels having vertically aligned hook-portions which extend through cooperable slots in the column structure and interlock with the inner face thereof.

25. A partition structure according to claim 24, comprising in further combination, means disposed within the column structure engageable with such a hanger to prevent disengagement of the latter from the column structure.

26. A partition structure according to claim 24, wherein said column structure has a plurality of sets of slots therein, each set being disposed to receive the hook portions of a cooperable hanger member, with said sets being disposed in lateral alignment around the periphery of such column whereby hanger members, and thus panels associated therewith, may be disposed in respective selected angular relationships about said column structure.

27. A partition structure according to claim 26, wherein said sets of slots are spaced from one another by angles of selected multiples of 45° and 60°.

28. A partition structure according to claim 26, wherein said column structure is provided with an outer layer of material which covers said sets of slots and may be selectively removed thereat to expose desired slots.

29. A column for use with unitary wall panels of a partition structure to support the same, comprising an elongated unitary column structure having means thereon engageable with means on a cooperable wall panel for supporting the latter from said column structure, the latter being divided along its length into a plurality of sections, at least one of which is rotatable about the axis of the column structure, said rotatable section having a conductor-access opening therein for the receipt of electrical conductors from such a cooperable wall panel supported by the column structure, means for retaining said column structure in assembled relation, and a hollow fitting, carried by said rotatable section, which defines said conductor-access opening and forms a conduit, adapted to extend from the association section to an adjacent wall panel, supported by the column structure, through which such electrical conductors may extend from the column structure to an adjacent wall panel.

30. A column according to claim 29, wherein said fitting is detachably connected to the associated column section.

31. A column according to claim 29, wherein said fitting is rigidly and permanently connected to the column section.

32. A column according to claim 29, wherein said access opening is disposed adjacent an end portion of said column structure, the latter having a member thereat which is detachable therefrom and which has that access opening formed therein, and means for maintaining said member and column structure in assembled relation.

33. A column for use with wall panels of a partition structure to support the same, comprising an elongated column structure divided along its length into a plurality of sections at least one of which is rotatable about the axis of the column structure, said rotatable section having a conductor-access opening therein for the receipt of electrical conductors from a cooperable wall panel supported thereby, a sleeve member at each junction of two adjacent sections of the column structure, each sleeve member having external dimensions of approximately equal to the corresponding internal dimensions of the column structure, said sleeve member being disposed within the column and provided with a radially outwardly directed annular flange thereon which extends between opposed edges of adjacent column sections, and means for retaining said column structure in assembled relation.

34. In a free standing, space dividing partition structure accommodating electrical conductors and employing a plurality of wall panels and cooperable elongated hollow supporting columns therefor, in which at least a pair of adjacent panels are supported, by a common column structure, at their vertical end edges by cooperable connecting means on said panels and said common hollow column structure, the combination of the hollow column structure having a plurality of access openings in the side walls thereof through which electrical conductors may extend from one wall panel of such a pair into the column structure and from the column structure into the other wall panel of such pair with the interior of the column structure forming a connecting conduit for such conductors between the respective wall panels of such pair, each of said panels being provided with conductor passageways along each edge thereof forming respective horizontal and vertical passageways for the reception of electrical conductors, the conductor access openings in the column structure being cooperable with access openings in at least one passageway, adjacent the column structure, in the edge portion of a vertically extending passageway, for the conduction of electrical conductors between the respective wall panels and the cooperable column structure.

35. In a free standing, space dividing partition structure accommodating electrical conductors and employing a plurality of wall panels and cooperable elongated hollow supporting columns therefor, in which at least a pair of adjacent panels are supported, by a common column structure, at their vertical end edges by cooperable connecting means on said panels and said common hollow column structure, the combinations of the hollow column structure having a plurality of access openings in the side walls thereof through which electrical conductors may extend from one wall panel of such a pair into the column structure and from the column structure into the other wall panel of such pair with the interior of the column structure forming a connecting conduit for such conductors between the respective wall panels of such pair, each of said panels being provided with conductor passageways along each edge thereof forming respective horizontal and vertical passageways for the reception of electrical conductors, the conductor access openings in the column structure being cooperable with access openings in at least one passageway adjacent the column structure for the conduction of electrical conductors between the respective wall panels and the cooperable column structure, the horizontally extending passageways being formed by elongated members of generally C-shape in transverse section, with the open side thereof exposed, and the vertically extending passageways are formed by tubular members.

36. A partition structure according to claim 35, wherein conductor access openings are formed in the tubular members.

37. A partition structure according to claim 35, wherein conductor access openings are formed by an open end of at least one channel member.

38. In a free standing, space dividing partition structure accommodating electrical conductors and employing a plurality of wall panels and cooperable elongated hollow supporting columns therefor, in which at least a pair of adjacent panels are supported, by a common column structure, at their vertical end edges by cooperable connecting means on said panels and said common hollow column structure, the combination of the hollow column structure having a plurality of access openings in the side walls thereof through which electrical conductors may extend from one wall panel of such a pair into the column structure and from the column structure into the other wall panel of such pair with the interior of the column structure forming a connecting conduit for such conductors between the respective wall panels of such pair, said wall panels each being provided with a channel member extending along a horizontal edge thereof for the reception of electrical conductors therein, each of said channel members having an open side defining the corresponding edge of the wall panel.

39. A column for use with wall panels of a partition structure to support the same, comprising an elongated column structure having a plurality of conductor access openings therein disposed at different points along the column structure, for the receipt of electrical conductors from a cooperable wall panel supported thereby, each access opening being defined by a tubular fitting adapted to extend from the column structure to a wall panel supported thereby, and extending radially outward from the column, with the fittings having the free ends thereof offset in axial direction with respect to the attachment to the column, such free ends being disposed in substantially a common plane normal to the axis of the column structure.

40. A column for use with wall panels of a partition structure to support the same, comprising an elongated column structure divided along its length into a plurality of sections at least one of which is rotatable about the axis of the column structure, said rotatable section having a conductor-access opening therein for the receipt of electrical conductors from a cooperable wall panel supported thereby, means for retaining said column structure in assembled relation, and a fitting, carried by said rotatable section, which defines said conductor-access opening and is adapted to extend from the associated section to a wall panel supported by the column, said access opening being disposed adjacent an end portion of said column structure, the latter having a member thereat which is detachable therefrom and which detachable member has a portion extending therefrom which contains said access opening, constructed for engagement with a channel member carried by a cooperable wall panel, and means for maintaining said member and column structure in assembled relation.

41. A column for use with wall panels of a partition structure to support the same, comprising an elongated column structure divided along its length into a plurality of sections at least one of which is rotatable about the axis of the column structure, said rotatable section having a conductor-access opening therein for the receipt of electrical conductors from a cooperable wall panel supported thereby, means for retaining said column structure in assembled relation, and a fitting, carried by said rotatable section, which defines said conductor-access opening and is adapted to extend from the associated section to a wall panel supported by the column, said column structure being provided with a plurality of slots therein which extend in axial direction, arranged to receive and interlock with mounting means carried by a cooperable wall panel, for providing at least partial support therefor.

42. A column according to claim 41, wherein said column structure is provided with means for restricting relative movement between the column structure and such a mounting means for preventing separation therebetween.

43. A column according to claim 42, wherein said restricting means comprises a member disposed with the column structure and adapted to engage the mounting means extending into the column of such a wall panel.

* * * * *